United States Patent [19]

Foote, Jr.

[11] 4,450,950
[45] May 29, 1984

[54] WORK PIECE TRANSFER MECHANISM

[75] Inventor: James C. Foote, Jr., York, N.Y.

[73] Assignee: Eastman Kodak Company, Rochester, N.Y.

[21] Appl. No.: 262,734

[22] Filed: May 12, 1981

[51] Int. Cl.³ .............................................. B65G 37/00
[52] U.S. Cl. .................................... 198/478; 198/480; 198/689
[58] Field of Search ............... 198/343, 574, 478, 480, 198/689, 631, 576, 575

[56] References Cited

U.S. PATENT DOCUMENTS

| | | |
|---|---|---|
| 1,402,818 | 1/1922 | Wentworth . |
| 2,415,997 | 2/1947 | Eldred . |
| 2,931,276 | 4/1960 | Zerlin . |
| 3,422,966 | 1/1969 | Iansons . |
| 3,548,745 | 12/1970 | Sirvet ............................. 198/480 X |
| 3,613,853 | 10/1971 | Linthicum ........................ 74/785 X |
| 3,805,944 | 4/1974 | Yurgan ........................... 198/631 X |
| 3,896,939 | 7/1975 | Harris . |
| 3,978,968 | 9/1976 | Rose et al. . |

FOREIGN PATENT DOCUMENTS 718242 10/1966 Italy ................................... 198/448

Primary Examiner—Joseph E. Valenza
Assistant Examiner—Dennis J. Williamson
Attorney, Agent, or Firm—Milton S. Sales

[57] ABSTRACT

A work piece transfer mechanism is disclosed for placing work pieces on a moving conveyance along an axis which is substantially normal to the direction of movement of the conveyance. The mechanism has a plurality of work piece holders which follow a hypocycloidal path and which always face radially outwardly. The mechanism is translated laterally alongside the path of the conveyance to match the conveyance velocity at the instant of work piece placement. Only one holder is extended at a time, so that the mechanism translation drive can be timed to the function of the extended holder.

7 Claims, 8 Drawing Figures

WORK PIECE TRANSFER MECHANISM

BACKGROUND OF THE INVENTION

1. Field of the Invention

This invention relates to apparatus for transferring work pieces between two or more positions. More particularly, the apparatus may be used to stack discrete components or to deliver them, during assembly operations, to a product which may be continuously moving along an assembly line.

2. Description of the Prior Art

Transfer mechanisms of the type which move articles around segments of a hypocycloidal path are known, such as those shown in U.S. Pat. No. 3,422,966, which issued on Jan. 21, 1969 to A. I. Iansons, and U.S. Pat. No. 3,896,939, which issued on July 29, 1975 to W. O. Harris. In the latter patent, work pieces are transferred to and from a holding device which moves along a hypocycloidal path to pick-up and place the work pieces when the holding device is at the cusps of the path. The mechanism has parallelogram linkages to control holding device orientation.

SUMMARY OF THE INVENTION

In accordance with the present invention, a work piece transfer mechanism is provided for moving work pieces between predetermined stations about a central axis. The mechanism has a plurality of work piece holders which follow a hypocycloidal path such that each point of each holder remains in a respective plane normal to the central axis, and the work piece holders always face radially outwardly. The mechanism is translated laterally alongside the path of the conveyance to match the conveyance velocity at the instant of work piece placement. By proper selection of gearing, only one work piece holder is extended at a time, so that the mechanism translation drive can be timed to the function of the extended holder.

The transfer mechanism provides high quantity parts handling capabilities, simple and inexpensive construction, low maintenance, smooth and shockless operation, and adaptability to many assembly system configurations. By matching the line speed of the parts moving through the system, and by moving the work pieces along a plane axis perpendicular to the central axis and parallel to the motion of the moving parts in a constant rotational orientation to the central axis, locational accuracy of parts relative to one another is enhanced.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings in which.

DETAILED DESCRIPTION OF THE PREFERRED EMBODIMENTS

Figure 1:
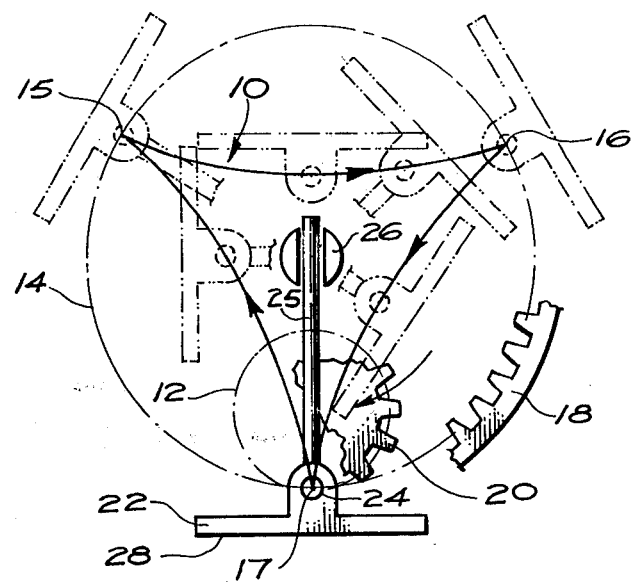
FIG. 1 is a schematic plan view of a work piece transfer mechanism in accordance with one embodiment of the present invention.

The geometric figure called a hypocycloid is referred to in FIG. 1 by reference numeral 10 and is generated by a point on a small circle 12 rolling without slippage inside a larger stationary circle 14. In FIG. 1, the large circle has a diameter three times that of the smaller circle. The resultant is a 3:1 hypocycloid which exhibits three points, or cusps, 15, 16, 17 all pointing radially outwardly from the center of large circle 14 and occurring at repeatable locations.

In practice, large circle 14 can be the pitch line of a ring gear 18 while small circle 12 can be the pitch line of a planet gear 20. A work piece holder 22 is rotatably mounted at 24 to planet gear 20, and has a guide rod 25 slidably mounted in a bearing 26 to keep the functional surface 28 of the holder always facing radially outwardly from the center of ring gear 18.

It can be seen that the device having the characteristics wherein the functional surface of the work piece holder moves along a hypocycloidal path while always facing radialy outwardly is well suited for moving work pieces between various work stations located at the cusps of the path. For example, the functional surface may serve to pick up work pieces at cusp 15, transfer the work pieces to cusp 16 where an operation is performed upon the work piece, and then transfer the work pieces to cusp 17 for removal and then return to cusp 15 to acquire another work piece. The sequential movement of the holder along the hypocycloid is shown schematically in FIG. 1 by the broken lines.

Figure 2:
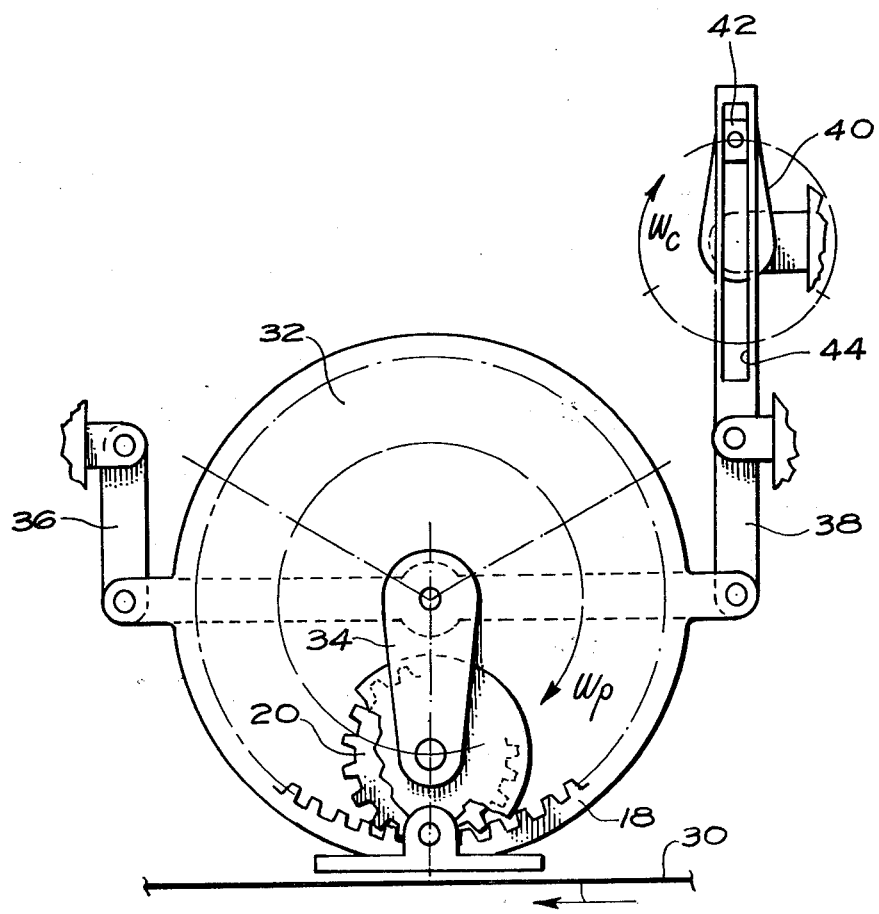
FIG. 2 is a schematic plan view of a work piece transfer mechanism similar to that of FIG. 1 with a translation device provided.

In many assembly operations, it is desired to deposit a work piece on a moving conveyance, such as shown at 30 in FIG. 2. The transfer mechanism can be mounted so that the work piece holder is moved laterally along the surface of the moving conveyance at the conveyance's velocity while the functional surface of the holder is near one of the hypocycloidal cusps. Referring still to FIG. 2, ring gear 18 is carried by a mechanism plate 32. Planet gear 20 rotates around the inside of ring gear 18 on an arm 34, itself rotatably mounted to mechanism plate 32 at the center of the ring gear.

Mechanism plate 32 has a parallelogram-type mounting through linkages 36 and 38. It can be swung back and forth across the surface of conveyance 30 by a rotating crank arm 40 and its associated slider block 42, which is captured within a slot 44 in linkage 38. Crank arm 40 rotates at the same angular velocity as arm 34, and the linkage dimensions are such that the mechanism plate translates through an arc of plus and minus 30° from the position shown as crank arm 40 completes one full revolution. At the position shown, and with proper selection of the translation linkage dimensions, the work piece holder is brought to a speed matching that of the conveyance surface velocity while the holder is near the cusp adjacent to the conveyance.

For high speed operation, accelerations of the work piece holder should be minimized. Such a reduction of acceleration can be achieved by multiple tooling. That is by providing more than one work piece holding device and slowing the rotation of arm 34 accordingly.

In most assembly operations, it is desirable to place successive parts on the moving conveyance at regular intervals. To achieve this, the work piece holders would be equally spaced circumferentially. The normal inclination would be to add enough planet gears and work piece holders, equally spaced, so that there are as many work piece holders as there are cusps of the hypocycloidal path. Hence, a 3:1 hypocycloid would carry three work piece holders, which would all arrive at their respective cusps simultaneously.

However, the translating motion which was described with respect to FIG. 2 cannot simultaneously satisfy the velocity requirements at all of the cusps. That is, the work piece holder which is depositing a work piece on moving conveyance 30 should be moving in the same direction and with the same velocity as the conveyance, while a work piece holder picking up a new work piece at another cusp or aligning the work piece with a work station at a third cusp should be substantially stationary while the work piece is being transferred or worked upon.

If the number of planet gears and associated work piece holders is not an integral multiple of the gear ratio, but still equally-spaced circumferentially (i.e., two planet gears at 180° for a 3:1 gear ratio, three planet gears at 120° for a 4:1 gear ratio, etc.), the work piece holders arrive at the respective cusps sequentially, and the velocity requirement for each work piece holder when at a cusp can readily be met.

Figure 4:
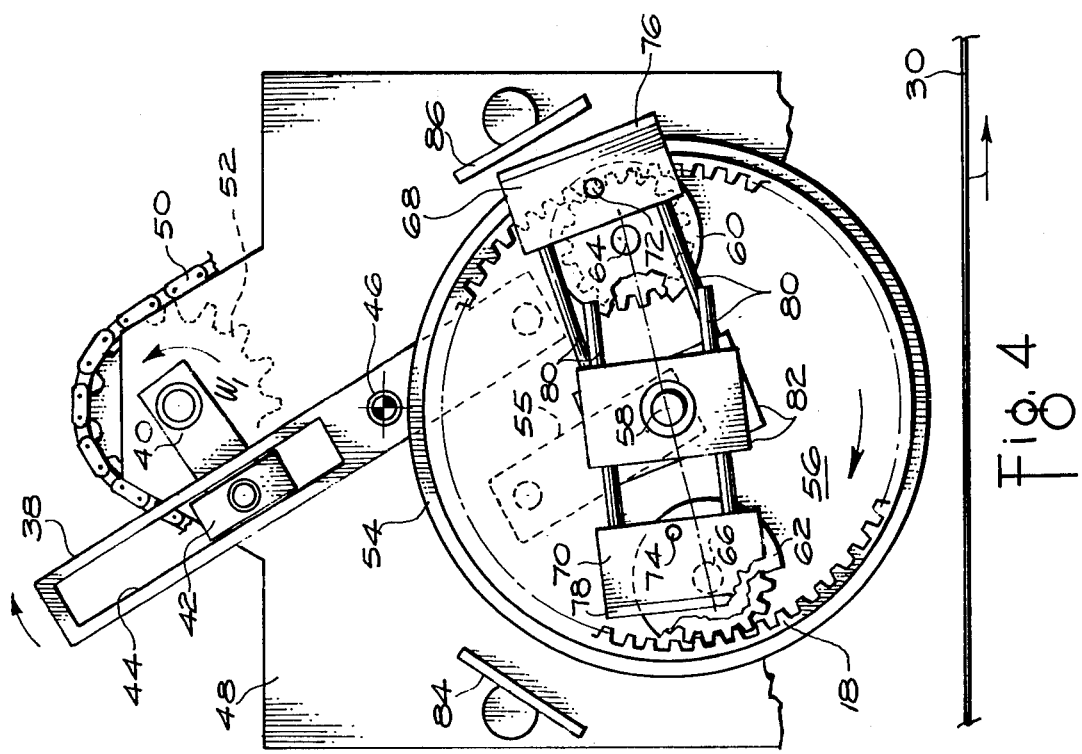
FIG. 4 is a top plan view of the work piece transfer mechanism shown in FIG. 3.
Figure 3:
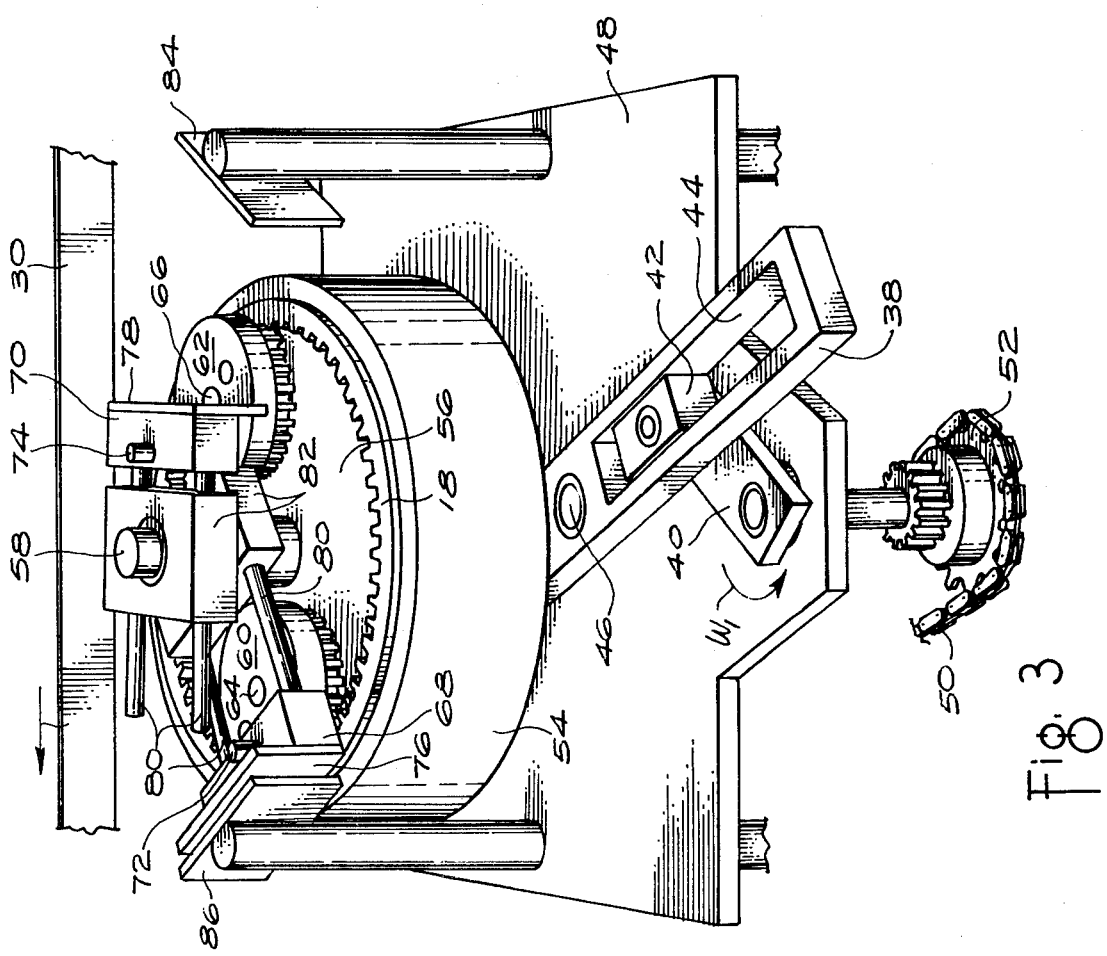
FIG. 3 is a perspective view of a work piece mechanism in accordance with a second embodiment of the present invention.

FIGS. 3 and 4 show a work piece transfer mechanism in accordance with another embodiment of the present invention. The reference numerals used to refer to particular elements in FIG. 1 will be used to refer to like elements in FIGS. 3 and 4.

A link 38 is rotatably mounted at 46 to a plate 48. A slider block 42 is captured in slot 44 of the link. The slider block revolves around a generally circular path, driven by chain 50 and sprocket 52 with a given angular velocity $\omega_1$.

At the other end of link 38, a cylindrical support 54 (corresponding to mechanism plate 32 of the embodiment shown in FIG. 2) has a ring gear 18 fixed thereto. A second link 55 interconnects support 54 and plate 48 to form a parallelogram mounting for support 54. Below the the ring gear, a mechanism plate 56 (corresponding to arm 34 of the embodiment shown in FIG. 2) is driven with an angular velocity of $\omega_1$ about a central shaft 58.

A pair of planet gears 60 and 62 are mounted on mechanism plate 56 for rotation about axes 64 and 66, respectively. A pair of work piece holders 68 and 70 are mounted on planet gears 60 and 62, respectively, by pivot pins 72 and 74, whose centers coincide with the pitch lines of their respective gears. As mechanism plate 56 revolves relative to ring gear 18, pins 72 and 74 trace hypocycloidal paths about the inside of the ring gear.

The functional surfaces 76 and 78 of work piece holders 68 and 70 are constrained to always face radially outwardly of shaft 58 by guide rods 80, which slide through blocks 82.

A pair of work stations have been schematically illustrated by pads 84 and 86 positioned on plate 48 at two of the cusps of the hypocycloid traced by the work piece holders. The other cusp of the hypocycloid is in the vicinity of moving conveyance 30.

Figure 5:
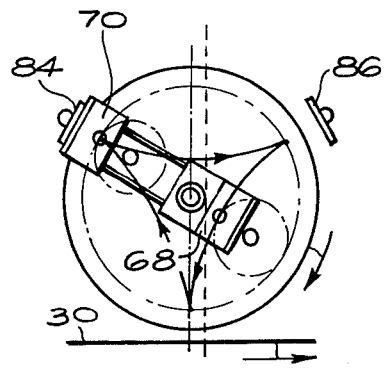
FIGS. 5-7 are schematic views of the work piece transfer mechanism of FIGS. 3 and a 4 shown in sequential positions.
Figure 6:
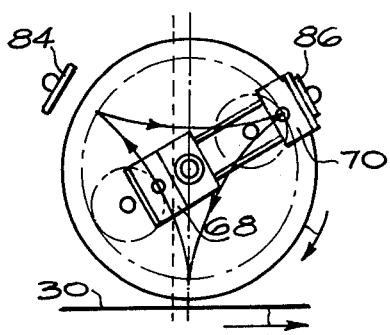
Figure 7:
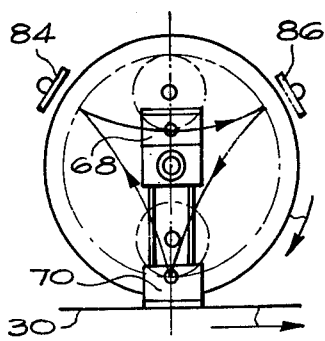

FIGS. 5-7 show the sequence of operation of the embodiment illustrated in FIGS. 3 and 4. Referring to FIG. 5, work piece holder 68 is at its fully retracted position and work piece holder 70 is fully extended to align with and approach work station 84. At that work station, parts to later be deposited on moving conveyance 30 may be picked up. The subassembly of the ring gear and its support, together with mechanism plate 56, the planet gears and the work piece holders has been shifted toward work station 84 by crank arm 40 and link 38 (FIG. 3).

Work piece holder 70 is withdrawn by further rotation of mechanism plate 56, and is reextended in the vicinity of work station 86. At that time, the subassembly has been moved to the right as viewed in FIG. 6, and additional work, such as alignment, punching, acquiring additional parts, etc. may be carried out on the work piece.

When work piece holder 70 is reextended in the vicinity of moving conveyance 30, the lateral speed of the functional face of the work piece holding device matches that of the conveyance due to rotation of crank arm 40 and link 38. The work piece can be deposited at that time on the moving conveyance.

It will be noted from FIGS. 5-7 that whenever work piece holder 70 is extended to approach a work station or conveyance 30, the other work piece holder 68 is retracted. As such, the position of the subassembly can be predetermined to locate the work piece holder in accordance with the function which it is carrying on at that moment. For instance, as a work piece holder approaches moving conveyance 30, the lateral speed of the device can be brought to that of the conveyance without adversely affecting the position or speed of the other work piece holder because the other work piece holder is not in the vicinity of a work station. This feature of the present invention would be present whenever the number of planet gears is other than an integral multiple of the gear ratio, so that the work piece holders arrive at the respective cusp sequentially rather than simultaneously.

Figure 8:
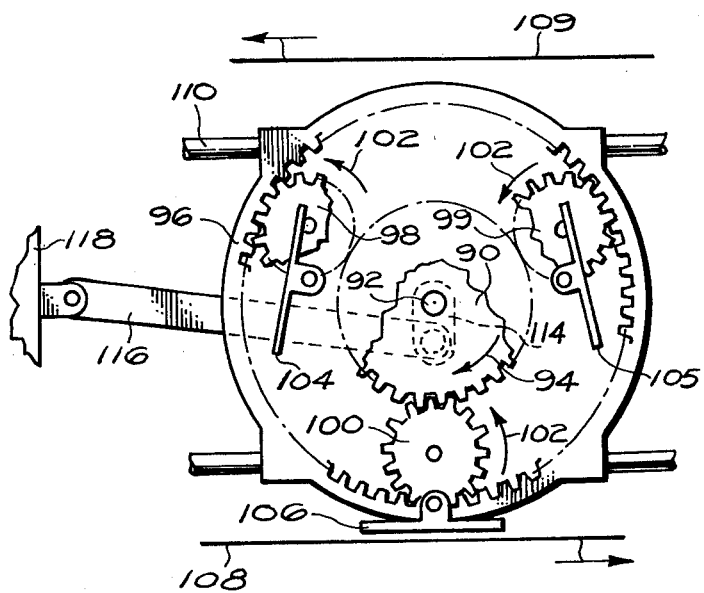
FIG. 8 is a top plan view of a work piece transfer mechanism in accordance with a third embodiment of the present invention.

A second preferred embodiment of the present invention is shown in FIG. 8, wherein there are three workpiece holders, and the gear ratio is 4:1. A driven sun gear 90 rotates on a shaft 92 in the direction of arrow 94 within a ring gear 96. Three planet gears 98-100 are captured between the sun and ring gears to rotate in the direction of arrows 102 about their centers, and in the direction of arrow 94 about shaft 92. Work piece holders 104-106 are mounted in planet gears 98-100, respectively. The mounting mechanisms for the work piece holders have been omitted for clarity, but may take the form of the guide rods and blocks shown in FIG. 3. Basically, though, the mountings are effective to keep the functional surfaces of the work piece holders facing radially outwardly.

By positioning the planet gears 120° apart around ring gear 96, and by providing a 4:1 gear ratio, the work piece holders trace a hypocycloidal path having for cusps spaced 90° apart. Each full revolution of sun gear 90 brings a successive one of the work piece holders to a cusp; no two of them reaching a cusp simultaneously.

Two of the work stations may be moving conveyances 108 and 109. The entire mechanism can be translated along guide rods 110 and 112 to a matching speed by providing a crank arm 114 which turns with shaft 92. The other end of the crank arm is pinned to a link 116 pivotally fixed to a stationary structure 118.

The invention has been described in detail with particular reference to a preferred embodiment thereof, but it should be understood that variations and modifications may be effected within the spirit and scope of the invention as described hereinabove and as as defined in the appended claims.

What is claimed is:

1. A transfer mechanism for moving work pieces between predetermined stations about a central axis wherein at least one of the stations includes a moving conveyance, said transfer mechanism comprising:
   at least one work piece holder mounted for rotational and translational movement;
   means for moving said holder along a generally hypocycloidal path about the central axis such that each point of said holder remains in a respective plane normal to the central axis, said path having a cusp adjacent to at least some of said stations; and
   means for moving said holder when at each of said stations which includes a moving conveyance, in a direction substantially parallel to the moving conveyance to match the velocity of the conveyance.

2. A transfer mechanism for moving work pieces between predetermined stations about a central axis wherein at least one of the stations includes a moving conveyance, said transfer mechanism comprising:
   at least one work piece holder mounted for rotational and translational movement;
   means for moving said holder along a generally hypocycloidal path about the central axis such that each point of said holder remains in a respective plane normal to the central axis, said path having a cusp adjacent to at least some of said stations;
   means for rotating said holder about an axis parallel to the transfer mechanism's central axis such that the rotational orientation of said holder relative to the central axis remains constant; and
   means for moving said holder when at each of said stations which includes a moving conveyance, in a direction substantially parallel to the moving conveyance to match the velocity of the conveyance.

3. A transfer mechanism for moving work pieces between predetermined stations about a central axis wherein at least one of the stations includes a moving conveyance, said transfer mechanism comprising:
   at least one work piece holder mounted for rotational and translational movement;
   means for moving said holders along a generally hypocycloidal path about the central axis such that each point of said holders remain in a respective plane normal to the central axis, said path having a cusp adjacent to at least some of said stations and no two holders reaching a cusp simultaneously; and
   means for moving said holders when at each of said stations which includes a moving conveyance in a direction substantially parallel to the moving conveyance to match the velocity of the conveyance.

4. A transfer mechanism as defined in claim 3 wherein the number of said holders is other than an integer multiple of the number of cusps of the hypocycloidal path.

5. A transfer mechanism for moving work pieces between work stations spaced about a central axis, said transfer mechanism comprising:
   a ring gear;
   a predetermined number of planet gears greater than one constrained to rotate about the interior of said ring gear, the planet gears being equally-spaced circumferentially and the ring to planet gear ratio being n:1, where said predetermined number is other than an integer multiple of n; and
   a work piece holder rotatably mounted on each of said planet gears for movement along a generally hypocycloidal path such that the cusps of said path align with the work stations and that the work piece holders arrive at respective cusps sequentially.

6. A transfer mechanism as defined in claim 5 further comprising a driven sun gear radially within the path of, and in driving engagement with said planet gears.

7. A transfer mechanism as defined in claim 5 further comprising means for rotating said holders about axes parallel to said central axis whereby the rotational orientation of said holders relative to said central axis remain constant.

* * * * *